United States Patent [19]
>
> Nishimura et al.

[11] 4,008,357
[45] Feb. 15, 1977

[54] BERYLLIUM BATTERY

[75] Inventors: Hajime Nishimura, Tokyo; Mitsuhisa Toda, Kawagoe, both of Japan

[73] Assignee: Citizen Watch Co., Ltd., Tokyo, Japan

[22] Filed: Sept. 23, 1975

[21] Appl. No.: 615,887

[30] Foreign Application Priority Data

Sept. 27, 1974 Japan .................... 49-111088
Nov. 11, 1974 Japan .................... 49-129762

[52] U.S. Cl. .................... 429/142; 429/162; 429/194; 429/218
[51] Int. Cl.² .................... H01M 2/16
[58] Field of Search ........ 136/100 R, 6 LN, 120 R, 136/121, 83 R, 22, 20, 137, 111; 429/142, 162, 194, 218

[56] References Cited

UNITED STATES PATENTS

| | | | |
|---|---|---|---|
| 3,248,265 | 4/1966 | Herbert | 136/6 LN |
| 3,450,570 | 6/1969 | Root | 136/120 R |
| 3,468,716 | 9/1969 | Eisenberg | 136/100 R |
| 3,658,592 | 4/1972 | Dey | 136/6 LN |
| 3,700,502 | 10/1972 | Watanabe et al. | 136/100 R X |
| 3,749,607 | 7/1973 | Jasinski et al. | 136/111 X |
| 3,758,343 | 9/1973 | Magritz | 136/111 |

Primary Examiner—Anthony Skapars
Attorney, Agent, or Firm—Spensley, Horn, and Lubitz

[57] ABSTRACT

A high efficiency, high capacity beryllium battery. The beryllium battery comprising an outer casing having an open end, an aperture plate closing said open end, a beryllium metal anode coupled to said aperture plate, a sulfide, sulfate or carbon fluoride composition cathodic material coupled to said outer casing, and an organic electrolyte.

5 Claims, 2 Drawing Figures

CHARGING TIME

BERYLLIUM BATTERY

FIELD OF INVENTION

This invention relates to batteries and more particularly to compact, high efficiency, high capacity battery structures.

DESCRIPTION OF PRIOR ART

To power portable electronic equipment, there exists in the art several different types of battery structures. The earliest type was the lead acid battery. The lead acid battery is undesirable in that it requires a highly corrosive liquid which is very difficult to contain and is usually very large in size. In order to overcome those difficulties, a carbon zinc dry cell was developed. This type of battery is more portable than the lead acid battery but is still relatively large for a reasonable voltage output and capacity. In order to increase the capacity and life span of the battery, alkaline batteries and nickel cadmium batteries have been developed. These batteries are higher in capacity but are still in relation to miniaturized equipment such as electronic wristwatches relatively large in size.

There does exist in the art batteries which are very small in size and are suitable for powering such devices as electronic wristwatches. The mercury cell is such a battery. The mercury cell has the disadvantage of having a relatively short life span in continuous operation.

SUMMARY OF THE INVENTION

In keeping with the principles of the present invention, the objects are accomplished with the unique combination of a two piece stainless steel container, a beryllium metal anodic substance coupled to one piece of the container, an cathodic active composition, and a liquid organic substance as the electrolyte. The cathodic active composition can be a carbon fluoride, a sulfide, or a sulfate. Furthermore, the two pieces of the container form the positive and negative terminals of the battery.

Accordingly, it is a general object of the present invention to provide a battery which is small in size and high in capacity.

It is also an object of the present invention to provide a battery which is small in size and has a long lifetime.

It is another object of the present invention to provide a battery whose output voltage is relatively invariant.

BRIEF DESCRIPTION OF THE DRAWINGS

The above-mentioned features and objects of the present invention will become more apparent by reference to the following description taken in conjunction with the accompanying drawings, wherein like reference numerals denote like elements, and in which.

DESCRIPTION OF THE PREFERRED EMBODIMENT

With respect to the development of electrical batteries, there exists two methods for improving the types of batteries that have been marketed up to the present time. From these two methods the development of new batteries which are higher in efficiency has been projected. Lately, substantial advances have been made, particularly in developmental studies of batteries that use lithium as an active anodic material. However, it has been proven that relative to the electrical power produced these batteries are much heavier than commonly used batteries but are superior with respect to the power output relative to the volume. Insofar as comparing lithium batteries with the usual type of batteries, the lithium battery voltage is much higher than the voltage produced by the liquid electrolyte batteries of the type existing in the art. Consequently, since it is evident that high voltages are available with single cell batteries, such high efficient batteries are considered of great utilitarian value. However, since at the usual voltages produced by ordinary batteries the amperage capacity is greater than that of ordinary batteries, lithium-type high efficient batteries can be considered to be of even greater utilitarian value. Furthermore, since the working voltage of battery operated devices is required to be invariant, the existence of a battery that could be used for long periods of time which has a substantially invariant output voltage would be welcome.

Another line of battery development is the development of a beryllium battery that uses either a sulfide, sulfate or fluoride of carbon composition as the cathodic active substance, and beryllium metal as the anodic active substance. Such a battery is the subject of the within invention.

With respect to the development of a beryllium battery, the following information is based on experimental comparisons of cathodic active materials. As for batteries with a sulfide or sulfate composition as the cathodic active material or batteries using a carbon fluoride as the cathodic active material, it has been ascertained by experimentation that their voltage output is much greater than that of batteries that use such compositions as calcium fluoride, aluminum fluoride, sodium fluoride, etc. Also, beryllium metal, which is theoretically higher in electrical current flow capacity, is used as a anodic active material. The beryllium metal is used because it has superior electrical conductivity properties. Beryllium is also superior to boron, which is considered to be relatively high in current flow capacity, and has advantages over boron with respect to molding. As for lithium, which has lately been extensively studied for use as a anodic active material, there is a problem in that the environment of the treatment site has a great influence on the molding of the lithium.

Figure 2:
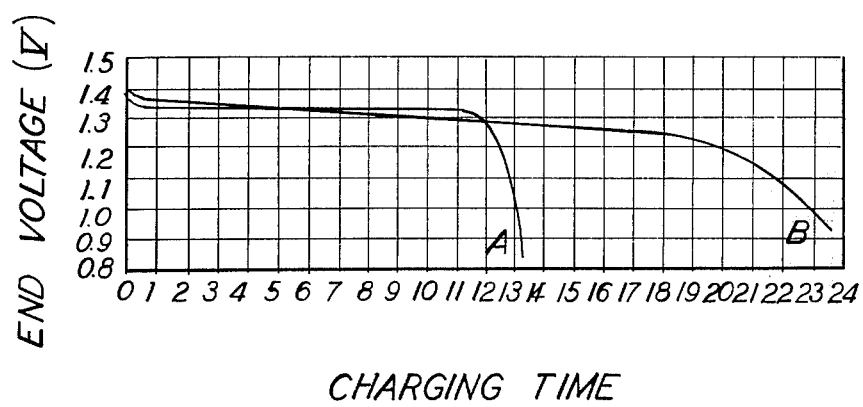
FIG. 2 is a graph of the output voltage characteristics versus time of a mercury cell and a battery in accordance with the teachings of the present invention.

Beryllium anodic material has been used for the above-mentioned reasons. With respect to the manufacture of beryllium anodic compounds, a flake-like form is especially desirable. The reason that a flake-like form is especially desirable is that when flakes of beryllium material are compression molded at a pressure of 4 tons per cm$^2$, there still is a porosity ratio of 42%. Due to the porosity of the molded anodic composition, additional retentive capacity is added for the electrolyte and the reaction area of the beryllium active material is augmented significantly. FIG. 2 is a comparison under identical conditions of the discharge characteristics of a practical example of a beryllium battery B in accordance with the teachings of the present invention and the discharge characteristics of a mercury cell A, both of the same capacity.

It can be clearly seen from FIG. 2 that the beryllium battery is a relatively high capacity battery. Experimentally, it has been determined that several different types of electrolytes can be used in the beryllium battery. Accordingly, any sulfide, sulfate, or carbon fluoride composition may be used as the cathodic active material in the beryllium battery without departing from the scope and spirit of the within invention. Since inorganic aqueous solutions are either acidic or basic, they would interact with the beryllium metal and therefore cannot be used in the beryllium battery. As for those electrolytes that remain, it is possible to use organic electrolytes similar to the types that have been tried in lithium and other batteries. With this in mind, several organic electrolytes have been developed which improve the characteristics of the beryllium battery.

It is possible to use any one of the following organic materials as the organic electrolyte: ethylene glycol monoethyl ether; diethyl malonate; lactonitrol; tetrahydrofurane; and benzyl acetate. Furthermore, formic acid ester-type electrolytes are desirable because their liquid resistance is particularly low. Furthermore, a glycerin derivative electrolyte which has superior maintainability is preferred. It is also known that the following electrolytes possess superior stability: ethyl benzoate, propylene carbonate, gamma-butylolactone, diethyl succinate, acetonitrol, and methyl-n-propylketone. Table 1 shows the voltages developed by beryllium batteries using various kinds of organic electrolytes.

TABLE 1

| Triacetin | 1.37 |
|---|---|
| Ethyl benzoate | 1.36 |
| Propylene carbonate | 1.38 |
| Gamma-butylolactone | 1.36 |
| Diethyl succinate | 1.35 |
| Acetonitrol | 1.38 |
| 2-pentanone | 1.40 |
| Methyl formate | 1.43 |
| Propyl formate | 1.36 |
| Amyl Formate | 1.40 |

Batteries using these electrolytes have also displayed superior stability during long-time corrosion tests.

Figure 1:
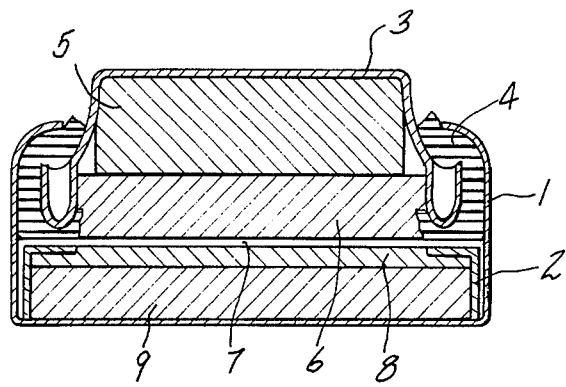
FIG. 1 is a simplified cross-sectional view of a battery in accordance with the teachings of the present invention.

Referring to FIG. 1, shown therein is a cross-sectional view of a simplified beryllium battery in accordance with the teachings of the present invention. The beryllium battery of FIG. 1 comprises an outside casing 1 constructed in the shape of a battery and having one open end. Outside casing 1 also functions as the positive terminal of the battery. Retaining ring 2 is contained within the body of outside casing 1, but may be omitted. Aperture sealing plate 3 closes the open end of outside casing 1 and forms the negative terminal of the battery. Beryllium metal 5 is the anodic active element and is coupled to aperture sealing plate 3 in the top of the battery. Gasket 4 couples aperture sealing plate 3 to and electrically insulates it from outside casing 1 and seals the electrolyte within the battery. Furthermore, retaining ring 2, when used, improves the tightness of gasket 4. The organic electrolyte is contained within permeable materials 6 and 8. Furthermore, permeable material 8 acts as an electrolyte chamber which is held in contact with the cathode 9 by a separator 7. Since the electrolyte in permeable material 8 is held in contact with the cathode 9 by separator 7, the contact between the cathode 9 and the electrolyte is enhanced thereby resulting in an increased electrical conductivity.

In practice, both the outside casing 1 and aperture sealing plate 3 may be made from nickel-plated or stainless steel sheets. Also, the electrolyte may be made of one mol of anahydrus lithium perchlorate dissolved in triacetin. Furthermore, the cathode 9 may be molded under high pressure from a composition which is 85% cupric sulfate, 14% lead, and 1% carboxymethyl cellulose.

Beryllium batteries according to the teachings of the present invention have a high capacity with an output voltage of approximately 1.3 volts. Such a battery has great practical value and great utility in devices such as electronic watches and the like.

In all cases, it is understood that the abovedescribed embodiment is merely illustrative of but one of many possible specific embodiments which represent application of the principles of the present invention. Furthermore, numerous and varied other arrangements can be readily devised in accordance with the principles of the present invention by those skilled in the art without departing from the spirit and scope of the invention.

We claim:
1. A beryllium battery comprising:
an outside casing having one open end;
an aperture sealing plate, said aperture sealing plate closing said open end in said outside casing and being electrically insulated from said casing;
an anode of beryllium metal coupled to said aperture sealing plate;
a cathodic material, said cathodic material being coupled to the inside of said outside casing;
a first permeable member in contact with said anode;
a second permeable member in contact with said cathodic material;
a separator means separating said first permeable member from said second permeable member;
a retainer ring for holding said second permeable member in contact with said cathodic material; and
an organic electrolyte disposed in said first and second permeable members.
2. A beryllium battery according to claim 1 wherein said anodic material comprises a composition selected from the group consisting of: sulfide compositions, sulfate compositions or fluoride of carbon compositions.
3. A beryllium battery according to claim 2 wherein the organic electrolyte is a formic acid group organic compound.
4. A beryllium battery according to claim 2 wherein the electrolyte comprises a glycerin derivative electrolyte.
5. A beryllium battery according to claim 2 wherein the electrolyte is selected from the group consisting of: ethyl benzoate, propylene carbonate, gamma-butylolactone, diethyl succinate, acetonitrol, or methyl-n-propylketone.

* * * * *